United States Patent
Yang et al.

(10) Patent No.: US 12,530,132 B2
(45) Date of Patent: Jan. 20, 2026

(54) MEMORY SYSTEMS WITH PARITY DATA GENERATED USING LATCHES IN MEMORY DEVICES

(71) Applicant: Yangtze Memory Technologies Co., Ltd., Hubei (CN)

(72) Inventors: Biao Yang, Hubei (CN); Suyi Liu, Hubei (CN); Lu Guo, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/674,409

(22) Filed: May 24, 2024

(65) Prior Publication Data

US 2025/0272000 A1    Aug. 28, 2025

(30) Foreign Application Priority Data

Feb. 28, 2024 (CN) .......................... 202410225119.2

(51) Int. Cl.
*G06F 3/06*      (2006.01)
(52) U.S. Cl.
CPC .......... *G06F 3/0619* (2013.01); *G06F 3/0659* (2013.01); *G06F 3/0679* (2013.01)

(58) Field of Classification Search
CPC ............................ G06F 3/0619; G06F 3/0679
See application file for complete search history.

(56) References Cited

U.S. PATENT DOCUMENTS

| 12,242,343 B2* | 3/2025 | Uribe | G06F 11/0772 |
| 2013/0179758 A1* | 7/2013 | Hwang | G06F 11/10 714/801 |
| 2016/0124809 A1* | 5/2016 | Lee | G11C 29/52 714/766 |
| 2017/0322843 A1* | 11/2017 | Hsu | G06F 3/0688 |
| 2023/0376230 A1* | 11/2023 | Magnavacca | G06F 3/0604 |

* cited by examiner

*Primary Examiner* — Mark A Giardino, Jr.
(74) *Attorney, Agent, or Firm* — HANLEY, FLIGHT & ZIMMERMAN, LLC

(57) ABSTRACT

Examples of the present disclosure provide a memory system and operating method thereof, and storage medium; wherein the memory system includes: a memory controller configured to send a first command, the first command including first data; and a memory device including a latch; the memory device coupled to the memory controller and configured to: receive the first command; in response to the first command, perform a logical operation on the first data with the latch to obtain parity data.

20 Claims, 11 Drawing Sheets

MEMORY SYSTEMS WITH PARITY DATA GENERATED USING LATCHES IN MEMORY DEVICES

CROSS-REFERENCE TO RELATED APPLICATION

The present application claims the benefit of priority to China Application No. 202410225119.2, filed on Feb. 28, 2024, the content of which is incorporated herein by reference in its entirety.

FIELD OF TECHNOLOGY

Examples of the present disclosure relate to the field of semiconductor technology, and in particular to memory systems and operating methods thereof, and storage mediums.

BACKGROUND

A memory device is a memory apparatus used to preserve information in modern information technology. As a typical non-volatile semiconductor memory, NAND (Not-And) memory has gradually become a mainstream product in the storage market due to its high storage density, controllable production cost, suitable programming and erasing speed and retention characteristics.

Figure 1:
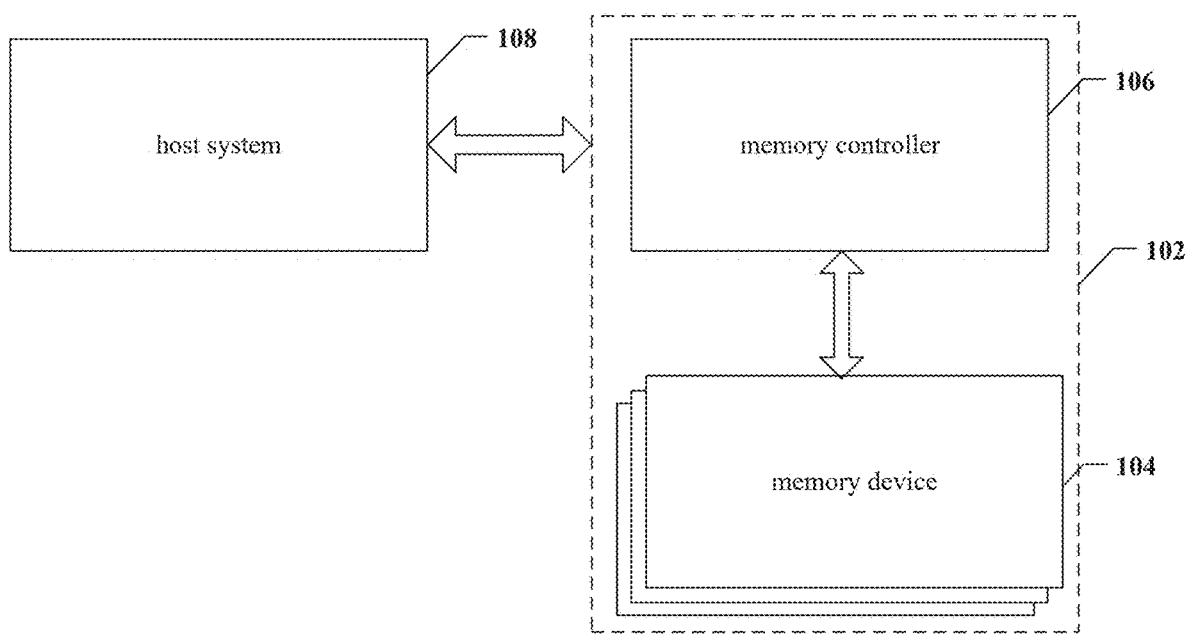
FIG. 1 is a schematic diagram of an example system with a memory system according to an example of the present disclosure.

In the accompanying drawings described above (not necessarily drawn to scale), similar reference numbers may describe similar components throughout the different figures. Similar reference numbers with different letter suffixes may represent different examples of similar components. The accompanying drawings generally illustrate the various examples discussed herein by way of example, and not limitation.

DETAILED DESCRIPTION

Examples of the present disclosure will be described in more detail below with reference to the accompanying drawings. Although example implementations of the present disclosure are shown in the accompanying drawings, it should be understood that the present disclosure may be implemented in various forms and should not be limited to the specific implementations set forth herein. Rather, these examples are provided so that the present disclosure can be more thoroughly understood and the scope of the present disclosure can be fully conveyed to those skilled in the art.

In the following description, numerous specific details are given in order to provide a more thorough understanding of the present disclosure. However, it will be apparent to one skilled in the art that the present disclosure may be practiced without one or more of these details. In other examples, in order to avoid confusion with the present disclosure, some technical features known in the art are not described; that is, not all features of the actual example are described here, and well-known functions and structures are not described in detail.

In the accompanying drawings, size of a layer, a region, an element and their relative sizes may be exaggerated for clarity. Like reference numerals refer to like elements throughout.

It will be understood that when an element or layer is referred to as being "on," "adjacent to," "connected to" or "coupled to" another element or layer, it may be directly on, adjacent to, connected to or coupled to another element or layer, or intervening elements or layers may be present. In contrast, when an element is referred to as being "directly on," "directly adjacent to," "directly connected to" or "directly coupled to" another element or layer, there is no intervening elements or layers present. It will be understood that, although the terms first, second, third etc., may be used to describe various elements, components, regions, layers and/or parts, these elements, components, regions, layers and/or parts should not be limited by these terms. These terms are only used to distinguish one element, component, region, layer or part from another element, component, region, layer or part. Thus, a first element, component, region, layer or part discussed below may be termed as a second element, component, region, layer or part without departing from teachings of the present disclosure. Whereas a second element, component, region, layer or part is discussed, it does not indicate that a first element, component, region, layer or part necessarily presents in the present disclosure.

The spatially relative terms such as "beneath", "below", "lower", "under", "above", "on", etc., may be used herein for ease of description to describe one element or feature's relationship to another element(s) or feature(s) as illustrated in the figures. It will be understood that the spatially relative terms are intended to encompass different orientations of the device in use or operations in addition to the orientation depicted in the figures. For example, if the device in the appended drawings is turned over, an element or a feature described as "below" or "beneath" or "under" another element or feature would then be oriented "above" another element or feature. Thus, terms "below" and "under" may encompass both directions of up and down. A device may be otherwise oriented (rotated 90 degrees or at other orientations) and the spatially relative descriptors used herein should be interpreted accordingly.

A term used herein is for the purpose of describing a particular example only and is not to be considered as limitation of the present disclosure. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, steps, operations, elements and/or parts, but do not exclude the presence or addition of one or more other features, integers, steps, operations, elements, parts and/or groups. As used herein, the term "and/or" includes any and all combinations of the associated listed items.

In order to understand the characteristics and technical content of examples of the present disclosure in more detail, implementations of examples of the present disclosure will be described in detail below in conjunction with the accompanying drawings, however, the accompanying drawings are for reference and description only, and are not intended to limit examples of the present disclosure.

Memory devices in examples of the present disclosure include but are not limited to a three-dimensional NAND memory, and for ease of understanding, a three-dimensional NAND memory is used as an example for illustration.

FIG. 1 illustrates a block diagram of an example system 100 with memory devices in accordance with some aspects of the present disclosure. The system 100 may be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having memory device therein. As shown in FIG. 1, the system 100 may include a host system 108 and a memory system 102, and the memory system 102 has one or more memory devices 104 and a memory controller 106. The host system 108 may be a processor of an electronic device (e.g., a central processing unit (CPU)) or a system on chip (SoC) (e.g., an application processor (AP)). The host system 108 may be configured to send data to or receive data from memory device 104.

According to some implementations, memory controller 106 is coupled to the memory device 104 and the host system 108 and is configured to control the memory device 104. The memory controller 106 may manage data stored in the memory device 104 and communicate with the host system 108. In some implementations, memory controller 106 is designed to operate in low duty cycle environments, e.g., Secure Digital (SD) card, Compact Flash (CF) card, Universal Serial Bus (USB) flash drive, or other media for use in electronic devices such as personal computer, digital camera, mobile phone, etc. In some implementations, the memory controller 106 is designed to operate in high duty cycle environment Solid State Disk (SSD) or embedded multimedia card (eMMC), where SSDs or eMMCs are used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical-to-physical address translation, wear leveling, etc. In some implementations, memory controller 106 is also configured to process error correction code (ECC) related to data read from or written to memory device 104. The memory controller 106 may also perform any other suitable functions, e.g., formatting the memory device 104. The memory controller 106 may communicate with external devices (e.g., the host system 108) according to a particular communication protocol. For example, the memory controller 106 may communicate with an external device through at least one of various interface protocols, e.g., USB protocol, MMC protocol, Peripheral Component Interconnect (PCI) protocol, PCI Express (PCI-E) protocol, advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

Figure 2A:
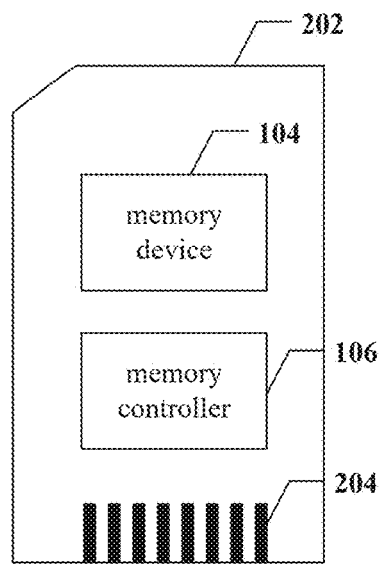
FIG. 2A is a schematic diagram of an example memory card with a memory system according to an example of the present disclosure.
Figure 2B:
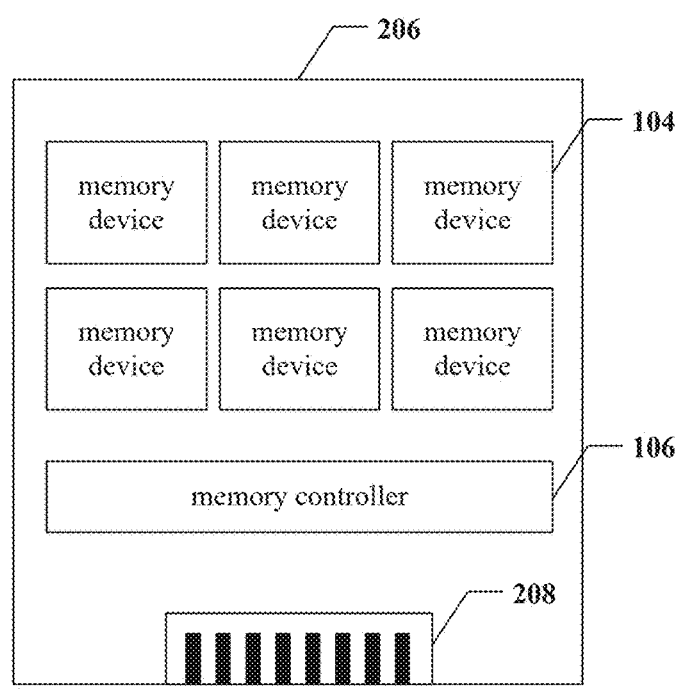
FIG. 2B is a schematic diagram of an example solid-state drive with a memory system according to an example of the present disclosure.

The memory controller 106 and one or more memory device 104 may be integrated into various types of storage devices, e.g., included in the same package (e.g., Universal Flash Storage (UFS) package or eMMC package). That is, memory system 102 may be implemented and packaged into different types of end electronic products. In one example as shown in FIG. 2A, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. The memory card 202 may further include a memory card connector 24 coupling memory card 202 with a host (e.g., host system 108 in FIG. 1). In another example as shown in FIG. 2B, memory controller 106 and multiple memory devices 104 may be integrated into a SSD 206. The SSD 206 may further include an SSD connector 208 coupling the SSD 206 with a host (e.g., the host system 108 in FIG. 1). In some implementations, the storage capacity and/or operating speed of SSD 206 is greater than the storage capacity and/or operating speed of memory card 202.

Figure 3A:
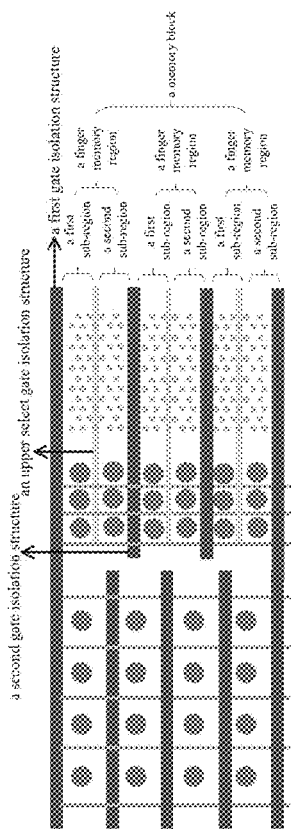
FIG. 3A is a schematic diagram of the distribution of memory cells of a three-dimensional NAND memory according to an example of the present disclosure.

FIG. 3A, as an example, provides a schematic structure diagram of a memory cell array of a three-dimensional NAND memory, and as shown in FIG. 3A, the memory cell array of the three-dimensional NAND memory is composed of several rows of memory cell rows parallel to the gate isolation structure and staggered in parallel, every two memory cell rows are separated by a gate isolation structure and an upper select gate isolation structure, and each memory cell row includes a plurality of memory cells. The gate isolation structure may include a first gate isolation structure and a second gate isolation structure, the first gate isolation structure divides the memory cell array into a plurality of blocks, and a plurality of second gate isolation structures divides a block into a plurality of fingers, an upper select gate isolation structure provided in the middle of each finger may divide the finger into two parts, thereby dividing the finger into two strings (String, abbreviated as Str). A block shown in FIG. 3A includes 6 strings, and in practical applications, the number of fingers in a block is not limited to this.

In some examples, each memory block may be coupled to multiple word lines (WL), multiple memory cells coupled to each individually controlled word line form a page, e.g., all memory cells in each finger in FIG. 3A are coupled to form a page.

It should be noted that the number of memory cell rows between the gate isolation structure and the upper select gate isolation structure shown in FIG. 3A is an example demonstration, and is not used to limit the number of memory cell rows included in a finger of the three-dimensional NAND memory in the present disclosure. In practical applications, the number of memory cell rows included in a finger may be adjusted according to actual conditions, such as 2, 4, 8, 16, etc.

Figure 3B:
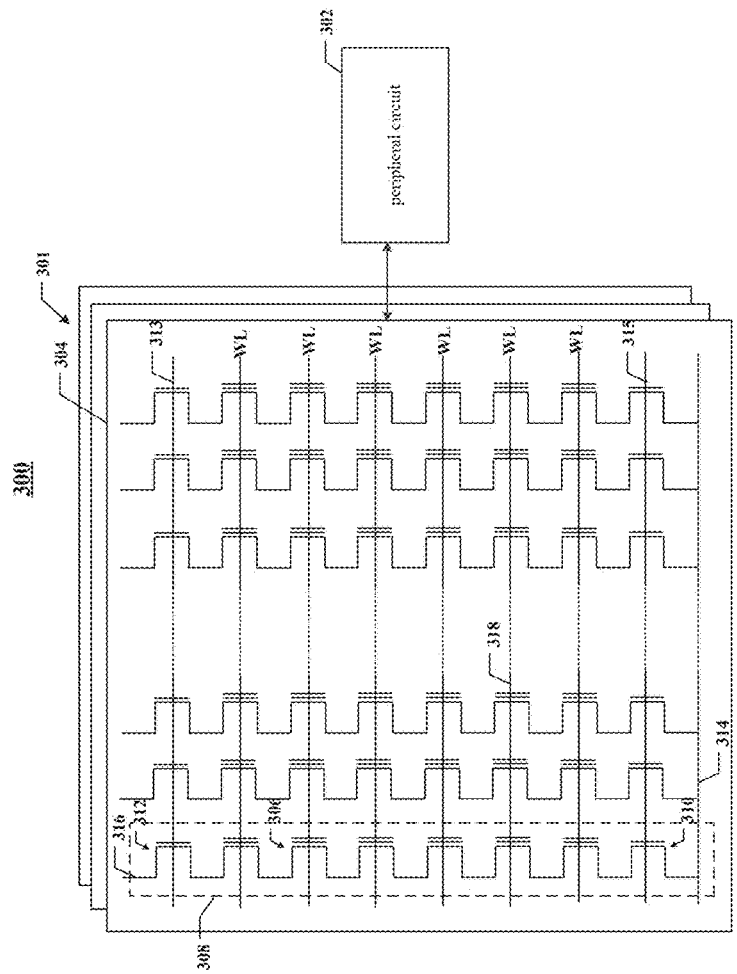
FIG. 3B is a schematic diagram of an example memory including peripheral circuits according to an example of the present disclosure.

FIG. 3B illustrates a schematic circuit diagram of an example memory device 300 including peripheral circuitry according to some aspects of the present disclosure. Memory device 300 may be an example of memory device 104 in FIG. 1. The memory device 300 may include a memory cell array 301 and a peripheral circuit 302 coupled to the memory cell array 301. Taking the memory cell array 301 being a three-dimensional NAND memory cell array as an example for illustration, where memory cells 306 is a NAND-type memory cell, and memory cells 306 are provided in the form of an array of memory strings 308, each memory string 308 extending vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the region of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible memory states and may thus store one bit of data. For example, a first memory state of "0" may correspond to a first voltage range, and a second memory state of "1" may correspond to a second voltage range. In some implementations, each memory cell 306 is a Multi-Level Cell (MLC) capable of storing more than a single bit of data in more than four memory states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to assume a range of possible nominal storage values. In one example, if each MLC stores two bits of data, the MLC can be programmed to assume one of three possible programming levels from the erased state through writing one of three possible nominal storage values into the cell, a fourth nominal storage value may be used for the erase state.

As shown in FIG. 3B, each memory string 308 may include a lower select transistor (also referred to as a source side select transistor, which includes a bottom select gate BSG 310) at its source terminal and an upper select transistor (also referred to as a drain side select transistor, which includes a top select gate TSG 312) at its drain terminal. The bottom select gate BSG 310 and the top select gate TSG 312 may be configured to activate the selected memory string 308 during read operation and program operation. In some implementations, the sources of memory strings 308 in a same memory block 304 are coupled through a same source line (SL) 314 (e.g., a common SL). In other words, according to some implementations, all memory strings 308 in a same memory block 304 have an array common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through applying a select voltage (e.g., above the threshold voltage of a transistor with a TSG 312) or a deselect voltage (e.g., 0V) to the corresponding TSG 312 via one or more TSG lines 313 and/or applying a select voltage (e.g., above the threshold voltage of a transistor with a BSG 310) or a deselect voltage (e.g., 0V) to the corresponding BSG 310 via one or more BSG lines 315.

As also shown in FIG. 3B, a memory string 308 may be organized into a plurality of memory blocks 304 each of which may have a common source line 314 (e.g., coupled to ground). In some implementations, each memory block 304 is the basic data unit for an erase operation, i.e., all memory cells 306 on the same memory block 304 are erased simultaneously. To erase the memory cell 306 in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. The memory cells 306 of adjacent memory strings 308 may be coupled through a word line 318 that selects which row of memory cells 306 is affected by read and program operations. In some implementations, in conjunction with the above FIG. 3A, multiple memory cells are isolated by an upper select gate isolation structure and a gate isolation structure, and a plurality of memory cells between the upper select gate isolation structure and the gate isolation structure are arranged into a plurality of memory cell rows, and each memory cell row is parallel to the gate isolation structure and the upper select gate isolation structure.

Referring to FIGS. 3A and 3B, each memory cell 306 of the plurality of memory cells is coupled to a corresponding word line 318, and each memory string 308 is coupled to a corresponding bit line 316 through a corresponding select transistor (e.g., top select transistor).

Figure 4:
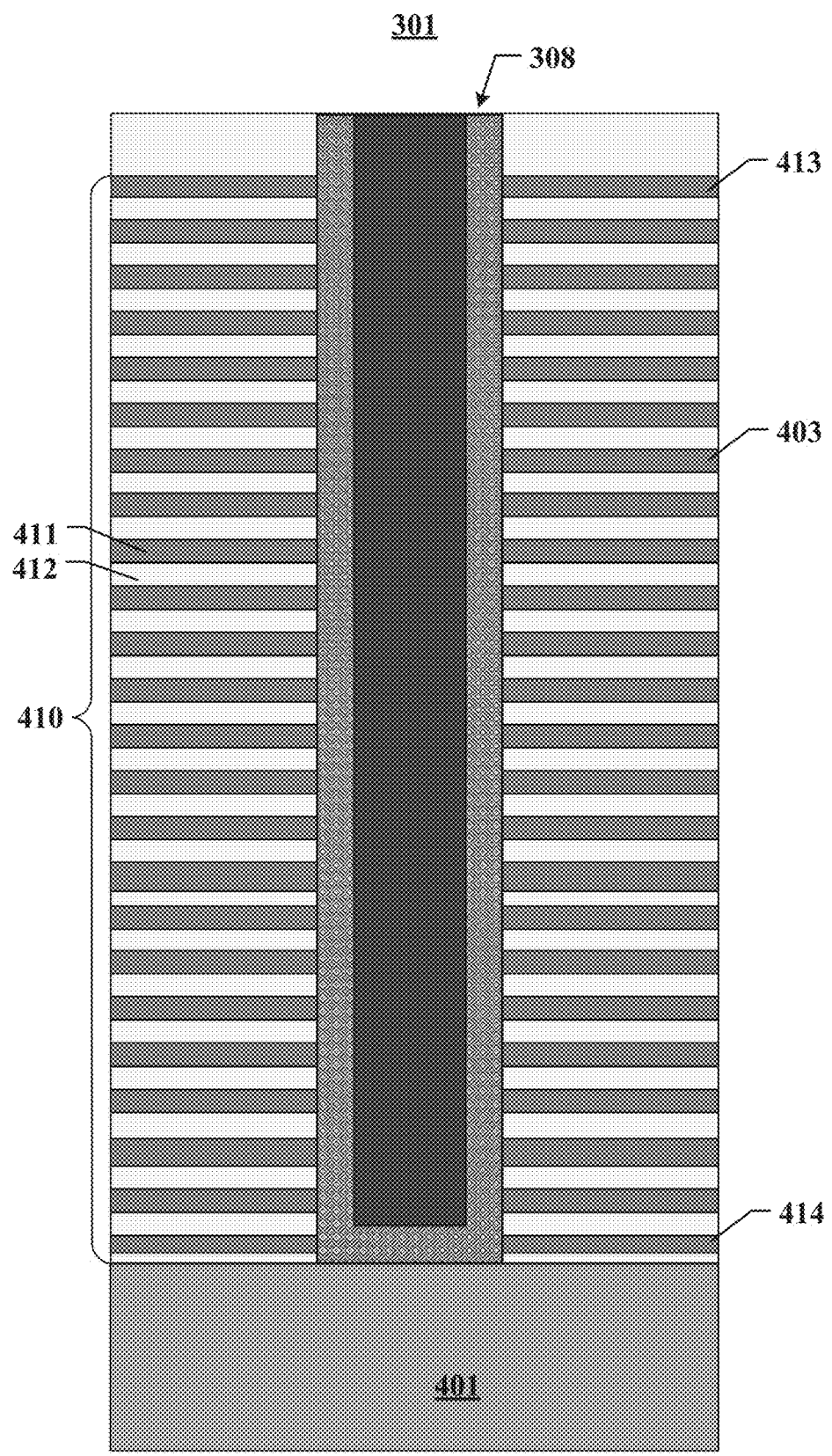
FIG. 4 is a schematic cross-sectional view of a memory cell array including NAND-type memory strings according to an example of the present disclosure.

FIG. 4 illustrates a schematic cross-sectional view of an example memory cell array 301 including memory strings 308, e.g., NAND, according to some aspects of the present disclosure. As shown in FIG. 4, the NAND memory cell array 301 may include a stacked structure 410, the stacked structure 410 includes a plurality of gate layers 411 and a plurality of insulating layers 412 alternately stacked in sequence, and the channel structure vertically penetrating through the gate layers 411 and the insulating layers 412, wherein the channel structure is coupled to each gate layer to form a memory cell, and the channel structure is coupled to multiple gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as an upper select gate line, a gate layer 411 at the bottom of a stacked structure 410 may extend laterally as a lower select gate line, and a gate layer 411 extending laterally between an upper select gate line and a lower select gate line may serve as a word line layer.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 5:
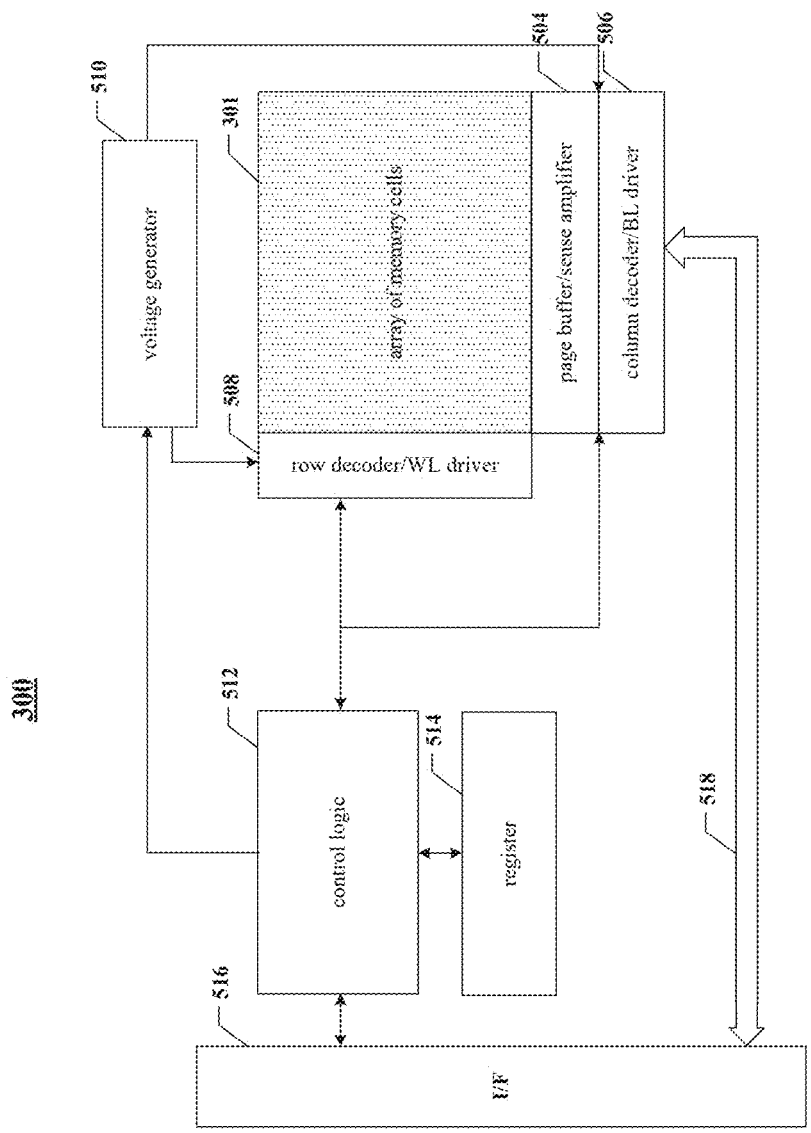
FIG. 5 is a schematic diagram of an example memory device including a memory cell array and peripheral circuits according to an example of the present disclosure.

Referring back to FIG. 3B, the peripheral circuit 302 may be coupled to the memory cell array 301 through bit line 316, word line 318, source line 314, BSG line 315, and TSG line 313. The peripheral circuit 302 may include any suitable analog, digital, and mixed-signal circuitry for facilitating operation of the memory cell array 301 through applying a voltage signal and/or a current signal to and sensing voltage signal and/or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, peripheral circuit 302 includes page buffer/sense amplifier 504, column decoder/bit line driver 506, row decoder/word line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from and program (write) data to the memory cell array 301 according to control signals from the control logic 512. In one example, the page buffer/sense amplifier 504 may store programming data (written data) to be programmed into the memory cell array 301. In another example, page buffer/sense amplifier 504 may perform a program verification operation to ensure that data has been correctly programmed into memory cell 306 coupled to selected word line 318. In yet another example, page buffer/ sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by control logic 512 and to select one or more memory strings 308 through applying a bit line voltage generated from voltage generator 510.

The row decoder/word line driver 508 may be configured to be controlled by control logic 512 and select/deselect memory block 304 of memory cell array 301 and select/ deselect word line 318 of memory block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to the selected word line 318. The voltage generator 510 may be configured to be controlled by the control logic 512, and generate word line voltage (e.g., read voltage, programming voltage, pass voltage, channel boost voltage, verify voltage, etc.), bit line voltage and source line voltage to be supplied to the memory cell array 301.

The control logic 512 may be coupled to each of other portions of the peripheral circuit described above, and configured to control operations of each of the other portions of the peripheral circuit. The register 514 may be coupled to the control logic 512 and include status register, command register and address register for storing status information, command operation code (OP code) and command address for controlling operations of each of the peripheral circuits. The interface 516 may be coupled to control logic 512 and act as a control buffer to buffer and relay control commands received from a host system (not shown) to control logic 512 and to buffer and relay status information received from the control logic 512 to the host system. Interface 516 may also be coupled to column decoder/bit line driver 506 via data bus 518 and act as a data I/O interface and data buffer to buffer and relay data to/from memory cell array 301.

Figure 6:
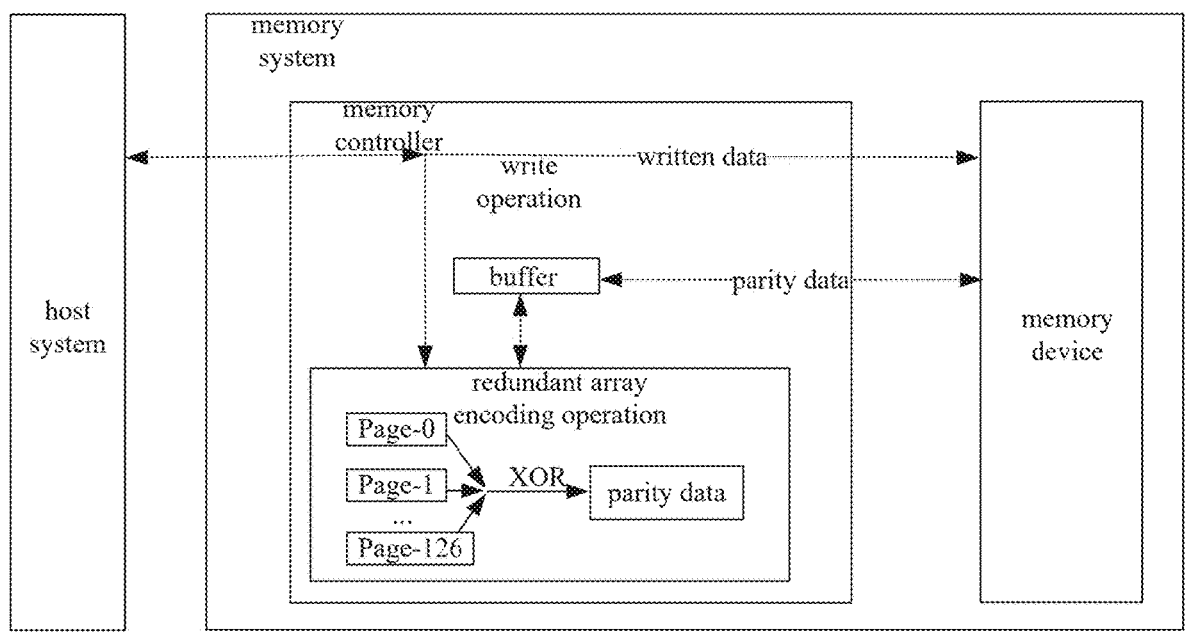
FIG. 6 is a schematic structural diagram of a memory system provided by an example of the present disclosure.

For a NAND memory, referring to FIG. 6, which is a schematic structural diagram of a memory system provided by an example of the present disclosure, wherein, during the process of performing the write operation, redundant array encoding operation is usually performed on the written data in the buffer of the memory controller, that is, logical operations (e.g., XOR operation, the operator is XOR) are performed on the data of multiple Pages (e.g., Page0, Page1 . . . . Page126) to form parity data, and the parity data is stored in the buffer; such that when errors occur in some written data, error correction and recovery of the data may be performed on the error data through the parity data stored in the buffer. In practical applications, as the larger the number of memory cell layers in the memory device is, the higher the probability of failure cells (i.e. 2WL Leakage Fail) occurring between WL and WL (e.g., WLn and WLn+1) is, and more parity data is required for error correction and recovery of written data, therefore, the redundant array encoding operation becomes increasingly complex, increasingly more parity data is formed, and the size of the space required for the buffer of the memory controller becomes increasingly larger. However, the size of the buffer of the memory controller is limited, that is, the storage space is limited, and it may not be able to store more parity data, making it impossible to solve the problem of user data loss caused by 2WL leakage.

Based on one or more of the problems described above, examples of the present disclosure provide a memory system and operating method thereof, and storage medium. Wherein the memory system includes: a memory controller configured to send a first command, the first command including first data; and a memory device including a latch; the memory device coupled to the memory controller and configured to: receive the first command; in response to the first command, perform a logical operation on the first data with the latch to obtain parity data.

Figure 7:
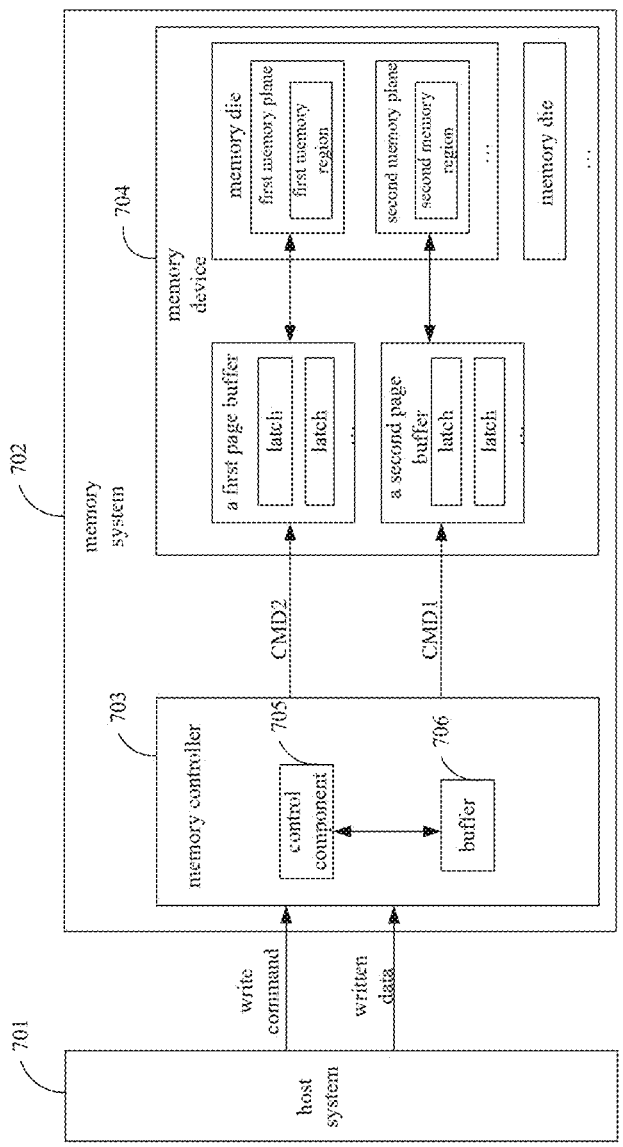
FIG. 7 is a schematic structural diagram of a host system and a memory system provided by an example of the present disclosure.

Referring to FIG. 7, FIG. 7 illustrates a schematic structural diagram of a host system and a memory system. As shown in FIG. 7, the memory system 702 is connected to the host system 701, and the host system 701 may be an electronic device such as a personal computer or a mobile terminal. The memory system 702 include: a memory controller 703 and a memory device 704, the memory controller 703 is to control the memory device 704 to perform operations such as read, write, and erase, and the memory controller 703 and the memory device 704 may be coupled in any suitable manner. The memory controller 703 may include a control component 705 and a buffer 706, the control component 705 is to control the memory system 702 as in a whole, the control component 705 is, e.g., a central processing unit (CPU), a microprocessor (MPU), etc. The memory device 704 may include multiple memory dies, and each memory die may include multiple memory planes, e.g., a first memory plane, a second memory plane, etc., and each memory plane may include multiple memory regions, each memory region may include multiple memory cells. The memory device 704 may also include multiple page buffers, e.g., a first page buffer, a second page buffer, etc., and each page buffer includes multiple latches.

Referring to FIG. 7, during the process of performing the write operation instructed by the host system, after the memory controller receiving the write command and written data sent by the host system, in response to the write command, sent a first command CMD1 to the memory device, the first command CMD1 includes first data, and the first data includes at least a portion of the written data, in other words, the first data may include all of the written data, or may include a portion of the written data. The memory device is configured to receive the first command CMD1 and store the received first data in the latch of the memory device; in response to the first command CMD1, perform a logical operation on the first data with the latch to obtain the parity data. Thus, it is the latch to perform logical operations, instead, in the related art, it is the buffer of the memory controller to perform logical operations, examples of the present disclosure may save the storage space of the buffer of the memory controller, and in turn reduce the demand for the storage space of the memory controller, thereby improving the storage performance of the memory controller.

It should be noted that the logical operation is, e.g., an XOR operation, here, the operation performed by the memory device in response to the first command CMD1 is a redundant array encoding operation (RAID) of the first data with the latch.

In some examples, after the memory controller receiving the write command and written data sent by the host system, and further in response to the write command, sends a second command CMD2 to the memory device, the second command CMD2 includes second data, and the second data includes all of the written data, i.e., the first data includes at least a portion of the second data. The memory device is configured to: receive the second command CMD2; in response to the second command CMD2, store the second data in a first memory region of the memory device, and the first memory region may include any one of multiple memory regions for the memory device.

It should be noted that the operation performed by the memory device in response to the second command CMD2 is a write operation of writing the second data into the first memory region.

It should be noted that the first command CMD1 and the second command CMD2 are two independent commands, and the data transmission paths corresponding to the two commands are also independent with each other, the sending order and response order of the first command CMD1 and the second command CMD2 may be selected and set according to actual demands, and are not limited in this disclosure. Similarly, the subjects who respond to the first command CMD1 and the second command CMD2 are also different; here, in order to avoid mutual interference between the first command CMD1 and the second command CMD2, different memory planes and latches corresponding to different memory planes are to respond to different commands. For example, when responding to the second command CMD2, the first memory plane and the first page buffer are used. When responding to the first command CMD1, the second memory plane and the second page buffer are used; here, the first memory region is located in the first memory plane, and the first page buffer and the second page buffer include different latches.

In some examples, the memory device is further configured to erase the first data after obtaining the parity data. Thus, the storage space of the latch may be saved and the utilization rate of the latch may be improved. The memory device is further configured to store the parity data in the first memory region of the memory device, or in the second memory region of the memory device. The first memory region and the second memory region are located in different memory planes respectively, in an example of the present disclosure, the first memory region is located in the first memory plane, the second memory region is located in the second memory plane, the first memory plane and the second memory plane are different memory planes, and the first memory plane and the second memory plane are located in the same memory die of the memory device.

Figure 8:
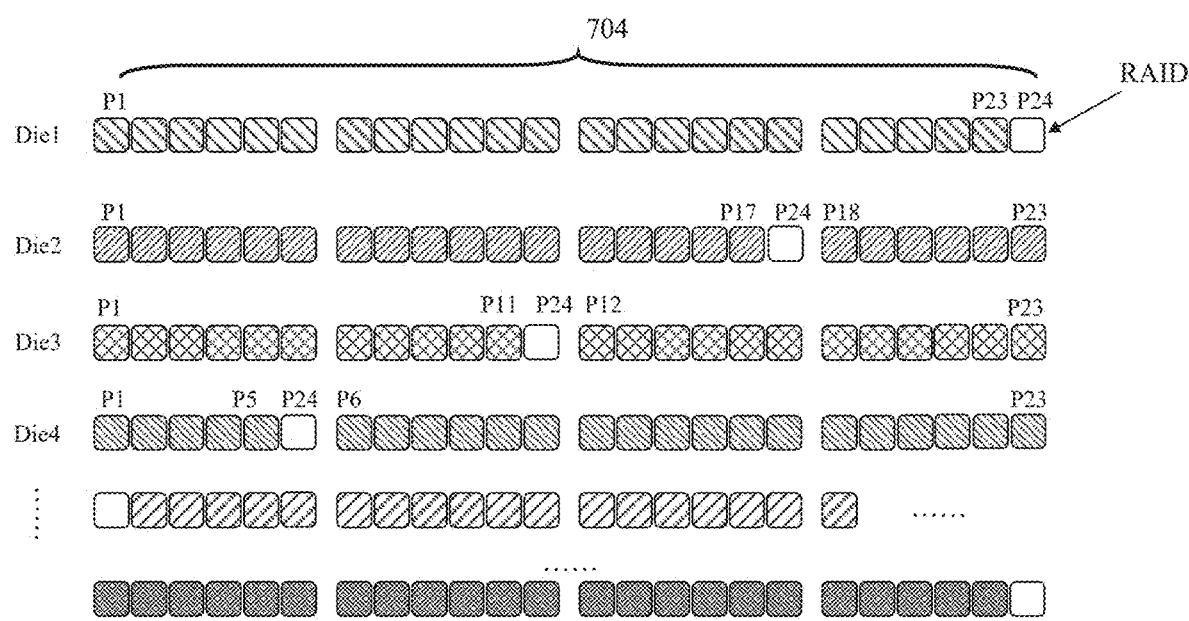
FIG. 8 is a schematic structural diagram of a memory device provided by an example of the present disclosure.

In some examples, refer to FIG. 8, which is a schematic structural diagram of a memory device 704 provided by an example of the present disclosure, where the memory device 704 includes multiple memory dies (e.g., Die1, Die2, Die3, Die4 . . . ), each memory die includes multiple memory planes (such as P1-P24), in which, some memory planes (e.g., P1-P23) of the multiple memory planes are taken as the first memory plane and configured to, in response to the second command CMD2, perform a write operation and store the written data; some other memory planes (e.g., P24) for the multiple memory planes are taken as the second memory plane and to, in response to the first command CMD1, perform a redundant array encoding operation RAID; wherein the parity data obtained by the redundant array encoding operation RAID may be stored in the first memory plane (first memory region) or second memory plane (second memory region).

The storage location of the parity data will be described in detail below combined with examples.

In some examples, when the first data includes all of the second data, that is, each of the first data and the second data includes all of the written data, the memory device is configured to: perform a first logical operation on the first data (all of the written data) with the latch to obtain the first parity data Parity1. Here, the first logical operation includes an XOR operation.

For example, after obtaining the first parity data Parity1, the memory device may, in response to the first command CMD1, directly store the first parity data Parity1 in the second memory region of the memory device, in other words, after each redundant array encoding operation is performed, the parity data may be stored in the memory plane corresponding to the current latch. At this point, the memory regions for the first parity data Parity1 and the second data are different.

For example, after obtaining the first parity data Parity1, the memory controller may be configured to: obtain the first parity data Parity1, and send a third command CMD3, wherein the third command CMD3 includes the first parity data Parity1. The memory device is configured to: receive the third command CMD3; in response to the third command CMD3, store the first parity data Parity1 in the first memory region, in other words, after the memory device completes the redundant array encoding operation RAID, the memory controller reads the parity data back into the buffer 706 of the memory controller, the memory controller then sends a third command CMD3 to instruct to store the parity data into the first memory region of the memory device. At this point, the memory regions for the first parity data Parity1 and the second data are the same. In other examples, the third command CMD3 and the second command CMD2 may be sent together, wherein when the third command CMD3 and the second command CMD2 are sent together, the parity data and the corresponding written data may be stored together in the same memory region (e.g., the first memory region) of the memory device.

In some examples, when the first data includes a portion of the second data, the second data includes first sub-data and second sub-data, the first data includes the first sub-data, or the first data includes the second sub-data, here and below, description will be given by taking the first data as the first sub-data as an example. In this case, the memory device is configured to perform a second logical operation on the first sub-data with the latch to obtain the second parity data Parity2. Here, the second logical operation includes an XOR operation.

In some examples, after obtaining the second parity data Parity2, the memory device is further configured to: in response to the first command CMD1, directly store the second parity data Parity2 into the second memory region, at this point, the memory regions for the second parity data Parity2 and the second data are different.

In some examples, after obtaining the second parity data Parity2, the memory controller is configured to: obtain the second parity data Parity2, and send a fourth command CMD4, the fourth command CMD4 includes the second parity data Parity2; the memory device is configured to: receive the fourth command CMD4; in response to the fourth command CMD4, store the second parity data Parity2 into the first memory region, at this point, the memory regions for the second parity data Parity2 and the second data are the same.

In other words, both the first parity data Parity1 and the second parity data Parity2 may be stored in the first memory region, the second memory region, or other memory regions, which is not limited in this disclosure.

Further, in order to ensure that each of the second data corresponds to parity data, and when the first data includes a portion of the second data (e.g., the first sub-data), the memory controller is further configured to: perform a third logical operation on the second sub-data to obtain a third parity data Parity3. Here, the third logical operation includes an XOR operation.

In some examples, after receiving the write data sent by the host system, the memory controller performs an XOR operation on the second sub-data in the buffer of the memory controller and obtains the third parity data Parity3. Here, the third parity data Parity3 may be directly stored in the buffer of the memory controller, or may also be stored in the memory device. When the third parity data Parity3 is stored in the memory device, the memory controller is further configured to: send a fifth command CMD5 to the memory device, the fifth command CMD5 includes the third parity data Parity3, and the fifth command CMD5 is to instruct to store the third parity data Parity3 in the first memory region, the second memory region or other memory regions for the memory device.

Based on this, when the second data (i.e., the written data) is damaged, the first parity data Parity1 may be to perform data error correction and recovery on the damaged second data, or the second parity data Parity2 and the third parity data Parity3 may be to perform data error correction and recovery on the damaged written data. That is to say, through the solutions described in the above examples, the problem of user data loss caused by 2WL leakage can be solved, thereby the product yield of the memory device can be improved. It should be noted that when detecting whether the product yield meets the requirements, it may be determined through detecting Defect part per million (DPPM) of the product.

In addition, it should be noted that, with reference to FIG. 8, each memory die of the memory device is provided with a first memory plane (e.g., P1-P23) and a second memory plane (e.g., P24), multiple second memory planes (e.g., P24) of the memory device are physically spaced apart, such that when each memory die selects the second memory plane (e.g., P24) as a region for processing RAID, the wear leveling between memory dies is reduced and the service life of the memory device is improved.

In order to make the inventive concept of the present disclosure clearer, the process of using the latch to perform logical operations on the first data will be described in detail below combined with examples.

After receiving the write data sent by the host system, the memory controller may determine to divide the first data into multiple groups of data corresponding to the number of bits according to the number of bits of the memory cell in the memory device (i.e., the number of storage bits). For example, when the memory cell in the memory device includes a trinary-level cell TLC, the memory controller divides the first data into three groups of data before sending the first command CMD1, i.e., the first group of data, the second group of data and the third group of data.

It should be understood that when the memory cell in the memory device includes a trinary-level cell TLC, the second data may be stored in the lower page (LP), middle page (MP) and upper page (UP) of the memory cell respectively. Here, when the first data includes all of the second data, the memory controller may determine the data in the first data corresponding to the data stored in the lower page (LP) in the second data as the first group of data, determine the data in the first data corresponding to the data stored in the middle page (MP) in the second data as the second group of data, and determine the data in the first data corresponding to the data stored in the upper page (UP) in the second data as the third group of data. Based on this, the first command CMD1 includes a first instruction, a second instruction and a third instruction, the first instruction includes a first group of data, the second instruction includes a second group of data, and the third instruction includes a third group of data.

Accordingly, the multiple latches of the memory device may be divided into a first latch, a second latch and a third latch; wherein the first latch is configured to receive and store the first group of data, the second latch is configured to receive and store the second group of data, and the third latch is configured to receive and store the third group of data. In response to the first instruction, a logical operation is performed on the first group of data with the first latch to obtain the first sub-parity data; in response to the second instruction, a logical operation is performed on the second group of data with the second latch to obtain the second sub-parity data; in response to the third instruction, a logical operation is performed on the third group of data with the third latch to obtain the third sub-parity data. In addition, after obtaining the first sub-parity data, the second sub-parity data, and the third sub-parity data, the first group of data in the first latch is erased, the second group of data in the second latch is erased, and the third group of data in the third latch is erased.

Figure 9:
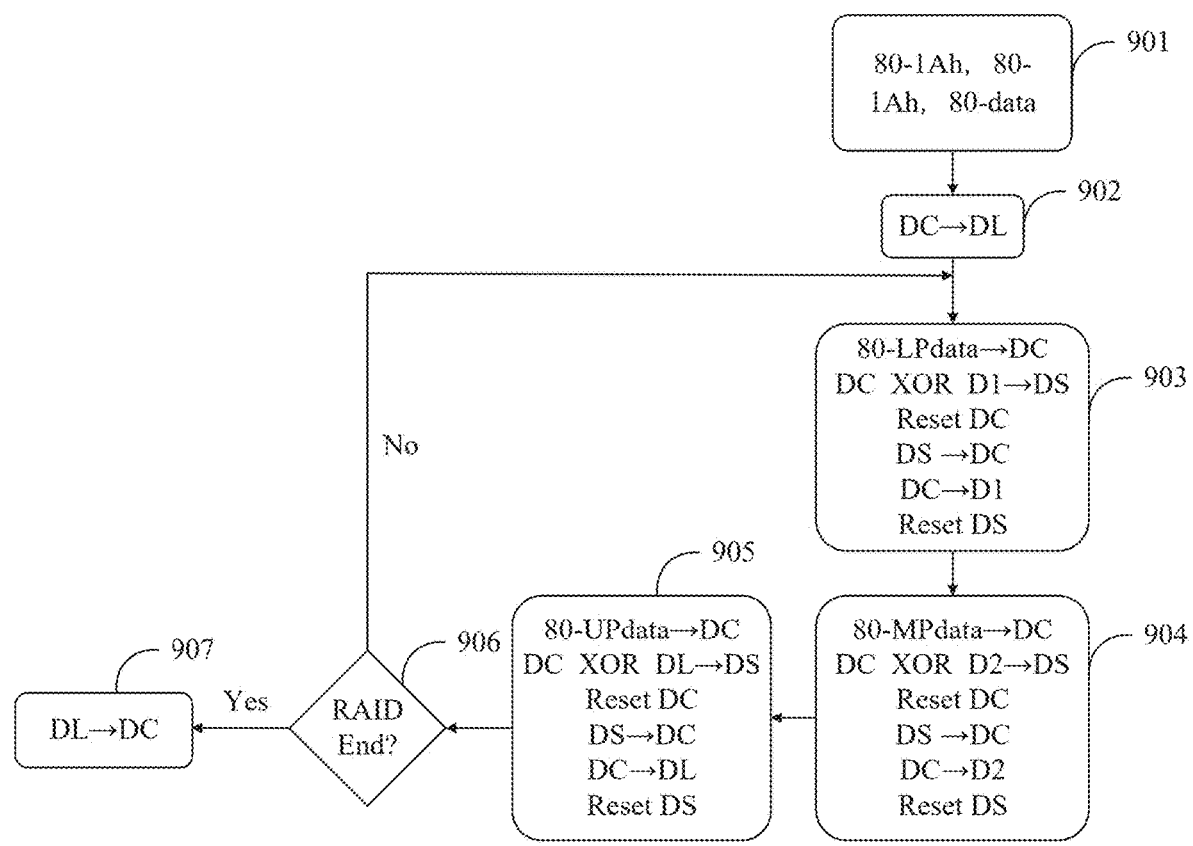
FIG. 9 is a schematic flowchart of operations of redundant array encoding operation provided by an example of the present disclosure.

It should be noted that due to limitations of the overall electronic components, the first data (i.e., the first group of data, the second group of data, and the third group of data) may be sent to the corresponding latch in multiple times, such as two times, three times, etc., so that the process of the latch performing logical operations is different from the process described above. Here, take the first data being sent to the latch in two times (such as the first time and the second time) as an example, that is, the first data includes a first portion of the first data and a second portion of the first data, e.g., the first portion of the first data includes a first portion of the first group of data, a first portion of the second group of data, a first portion of the third group of data; the second portion of the first data includes a second portion of the first group of data, a second portion of the second group of data, and a second portion of the third group of data. It should be understood that the first data may also be sent to the latches in times by other allocation methods, which is not limited here. Based on this, the process of performing a logical operation on each group of data will be described in detail below in conjunction with FIG. 9. FIG. 9 is a schematic flowchart of operations of a redundant array encoding operation provided by an example of the present disclosure.

Operation 901: The memory device receives the 80-1 Ah, 80-1 Ah, and 80-data instructions for the first time (the first instruction, the second instruction, and the third instruction are not distinguished here), and the instructions include the first portion of the first data (i.e., the first portion of the first group of data, the first portion of the second group of data and the first portion of the third group of data). Operation 902: In response to the instructions described above, the received first portion of the first group of data, the received first portion of the second group of data, and the received first portion of the third group of data are logically converted and stored in the DC latch, and then based on the different types of data (the types here may be divided according to the upper page, middle page, or lower page in which the data is stored), the first portion of the first group of data may be transferred to the first latch (D1), the first portion of the second group of data may be transferred to the second latch (D2), and the first portion of the third group of data may be transferred to the third latch (DL) (DC→DL as shown in FIG. 9). At this point, the DC latch is cleared.

The memory device receives the 80-1 Ah, 80-1 Ah, and 80-data instructions for the second time (not shown in FIG. 9), and the instructions include the second portion of the first data (i.e., the second portion of the first group of data, the second portion of the second group of data and the second portion of the third group of data). Operation 903: In response to the instructions described above, after the second portion of the first group of data is stored in the DC latch (80-LPdata→DC), a logical operation is performed on the second portion of the first group of data in the DC latch and the first portion of the first group of data in the D1 latch (DC XOR D1) to obtain parity data, and the parity data is stored in the DS latch (DC XOR D1→DS), next, the DC latch is cleared (i.e. Reset DC) and the D1 latch is reset (not shown in FIG. 9). As described before, due to limitations of overall electronic components, the method also includes: transferring the data in the DS latch to the DC latch, then transferring the data in the DC latch to the D1 latch, and clearing the DS latch (i.e., Reset DS) and the DC latch; in other words, the parity data corresponding to the first portion of the first group of data and the second portion of the first group of data is finally stored in the D1 latch.

Operation 904: In response to the instructions described above, after the second portion of the second group of data is stored in the DC latch (80-MPdata→DC), a logical operation is performed on the second portion of the second group of data in the DC latch and the first portion of the second group of data in the D2 latch (DC XOR D2) to obtain parity data, and the parity data is stored in the DS latch (DC XOR D2→DS), next, the DC latch (i.e. Reset DC) is cleared and the D2 latch is reset (not shown in FIG. 9). Furthermore, the data in the DS latch is transferred to the DC latch, then the data in the DC latch is transferred to the D2 latch, and the DS latch and the DC latch are cleared; in other words, the parity data corresponding to the first portion of the second group of data and the second portion of the second group of data is finally stored in the D2 latch.

Operation 905: In response to the instructions described above, after the second portion of the third group of data is stored in the DC latch (80-UPdata→DC), a logical operation is performed on the second portion of the third group of data in the DC latch and the first portion of the third group of data in the DL latch (DC XOR DL) to obtain parity data, and the parity data is stored in the DS latch (DC XOR DL→DS), next, the DC latch (i.e. Reset DC) is cleared and the DL latch is reset (not shown in FIG. 9). Furthermore, the data in the DS latch is transferred to the DC latch, then the data in the DC latch is transferred to the DL latch, and the DS latch and the DC latch are cleared; in other words, the parity data corresponding to the first portion of the third group of data and the second portion of the third group of data is finally stored in the DL latch.

Operation 906: It is determined whether the current redundant array encoding operation ends (RAID End?); when the determination result shows that the redundant array encoding operation does not end (No), return to operation 903; when the determination result shows that the redundant array encoding operation ends (Yes), operation 907: transfer all three groups of parity data stored in the D1 latch, D2 latch and DL latch to the DC latch (D1→DC, D2→DC, DL→DC).

In other examples, when the first data includes a portion of the second data, and when the first data includes the data from the second data stored in an upper page (UP), or a middle page (MP), or a lower page (MP), or any two pages of an upper page (UP), a middle page (MP), a lower page (MP) of the memory cell, the memory controller may divide the first data into multiple groups of data according to different situations (e.g., according to the principle of equal distribution of data volume, or according to the principle of different data types in the upper page (UP), middle page (MP), and lower page (LP), etc.), (e.g., the first data divides into a first group of data, a second group of data and a third group of data according to different data types of the upper page (UP), middle page (MP) and lower page (LP).), at this point, the first command includes multiple instructions (e.g., a first command, a second command and a third command), accordingly, multiple groups of parity data are obtained (e.g., three groups of parity data correspond to the upper page (UP), middle page (MP), and lower page (LP) respectively) after logical operations. The first data may also be used as a group of data to obtain a group of parity data, in this case, the first command only includes one instruction, that is, one instruction corresponds to a group of data.

In other examples, when the memory cell in the memory device is a single-level cell SLC, whether the first data includes all of the second data or a portion of the second data, before sending the first command CMD1, the memory controller may take the first data as one group of data, or may divide the first data into multiple groups of data (e.g., dividing the first data into three groups of data) to perform logical operations. However, it should be understood that the number of groups of parity data finally obtained is related to the corresponding page number in the first data; e.g., for the trinary-level cell TLC, when the first data corresponds to each of the upper page, middle page, and lower page, the finally obtained parity data is divided into three groups, i.e., the three groups of parity data correspond to the upper page, middle page, and lower page in TLC respectively. For single-level cell SLC, the finally obtained parity data is only one group of parity data, and one group of parity data corresponds to one page of SLC.

In other examples, for SLC, when the first data is taken as a group of data, the first command includes an instruction, based on which a logical operation is performed on a group of data to obtain a group of parity data. When the first data is divided into multiple groups of data, the first command includes multiple instructions, and logical operations are performed on each group of data among the multiple groups of data based on the multiple instructions respectively to obtain multiple groups of parity data; next, the method also includes: performing logical operations on the multiple groups of parity data again to obtain a final group of parity data.

Based on this, compared to some examples in which redundant array encoding operations are performed with the buffer of the memory controller in the way of SLC swap, in the foregoing examples of the present disclosure, it takes relatively less time to perform redundant array encoding operations respectively on different groups of data with different latches in the memory device; moreover, based on the same first data, when redundant array encoding operations are performed in the way of SLC swap, the number of times to read the parity data is relatively large, therefore, there is a write amplification problem and a problem of reducing the life of the memory system (e.g., the total number of bytes that can be written during the system life cycle (Total Bytes Written, TBW)). In some examples of the present disclosure, after obtaining the parity data, the parity data is directly stored in the memory device, which may reduce the number of times for reading the parity data and reduce the probability of write amplification, thereby extending the life of the memory system.

Figure 10:
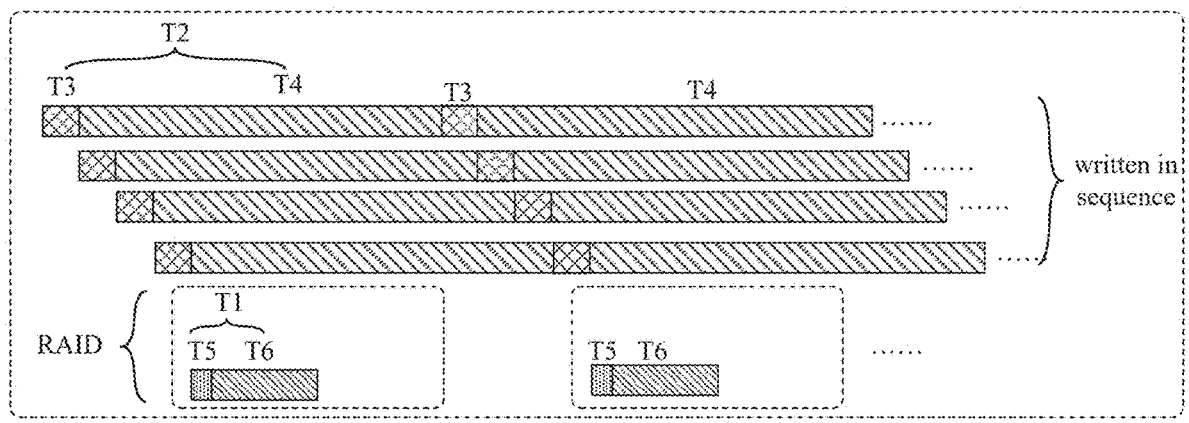
FIG. 10 is a schematic diagram of time comparison of write operations and encoding operations provided by an example of the present disclosure.

In addition, with reference to FIG. 10, FIG. 10 shows a schematic diagram comparing the time for performing a redundant array encoding operation RAID and a write operation using the method described in the above example of the present disclosure; as can be seen from FIG. 10, in the Sequential Write mode, the redundant array encoding operation RAID may be performed simultaneously with the write operation, and the time T1 spent for performing the redundant array encoding operation RAID is less than the time T2 spent for performing the write operation. As shown in FIG. 10, the time T2 spent for each write operation includes the time spent for receiving the second command (T3), the time spent for the second data transmission and storage (T4), and the time spent for the redundant array encoding operation T1 includes the time spent for receiving the first command (T5), the time spent for the first data transmission and encoding operation of the first data (T6), here, T2>T1, that is, (T3+T4)>(T5+T6). In other words, the redundant array encoding operation in the example of the present disclosure can be performed hidden during the write operation, such that it is not required to spend extra time to perform the redundant array encoding operation.

Based on this, in examples of the present disclosure, the memory controller sends the first data to the memory device by sending a first command, and after receiving the first data, the memory device performs a logical operation on the first data with the latch of the memory device, such that it is the latch to perform logical operations of the first data, instead the memory controller to perform logical operations, thus reducing the demand for storage space of the memory controller and improving the storage performance of the memory controller, thereby improving the performance of the memory system.

Figure 11:
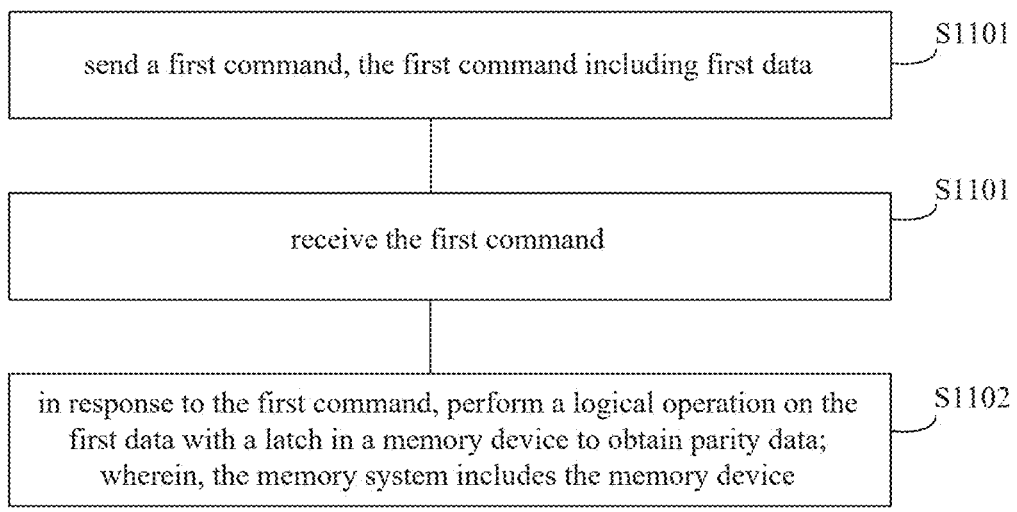
FIG. 11 is a schematic flowchart of a method for operating a memory system provided by an example of the present disclosure.

Based on the memory system described above, an example of the present disclosure provides a method for operating a memory system, as shown in FIG. 11, FIG. 11 illustrates a schematic flow chart of the method for operating the memory system, wherein the method includes the following content: S1101: sending a first command, the first command including first data; S1102: receiving the first command; S1103: in response to the first command, performing a logical operation on the first data with a latch in a memory device to obtain parity data; wherein, the memory system includes the memory device.

In some examples, the operating method further includes: sending a second command; the second command including second data; the first data including at least a portion of the second data; receiving the second command; in response to the second command, storing the second data in a first memory region of the memory device.

In some examples, when the first data includes all of the second data, the performing a logical operation on the first data with a latch in a memory device to obtain parity data includes: performing a first logical operation on the second data with the latch to obtain first parity data.

In some examples, the operating method further includes: in response to the first command, storing the first parity data in the second memory region of the memory device.

In some examples, the operating method further includes: obtaining the first parity data and send a third command; the third command including the first parity data; receiving the third command; in response to the third command, storing the first parity data in the first memory region.

In some examples, when the first data includes a portion of the second data, the second data includes first sub-data and second sub-data, and the first data includes the first sub-data, the performing a logical operation on the first data with a latch in a memory device to obtain parity data includes: performing a second logical operation on the first sub-data with the latch to obtain second parity data.

In some examples, the operating method further includes: performing a third logical operation on the second sub-data to obtain third parity data.

In some examples, the operating method further includes: in response to the first command, storing the second parity data in the second memory region of the memory device.

In some examples, the operating method further includes: obtaining the second parity data and sending a fourth command; the fourth command including the second parity data; receiving the fourth command; in response to the fourth command, storing the second parity data in the first memory region.

In some examples, the memory device includes a first memory plane and a second memory plane, and the first memory region is located in the first memory plane, and the second memory region is located in the second memory plane.

In some examples, the first memory plane and the second memory plane are located in a same memory die of the memory device.

In some examples, when the first data includes a first group of data, a second group of data and a third group of data, the latches include a plurality of latches; the plurality of latches include a first latch, a second latch and a third latch; the performing a logical operation on the first data with a latch in a memory device to obtain parity data includes: performing the logical operation on the first group of data with the first latch to obtain first sub-parity data; performing the logical operation on the second group of data with the second latch to obtain second sub-parity data; performing the logical operation on the third group of data with the third latch to obtain third sub-parity data.

In some examples, the memory system includes a Universal Flash Storage (UFS) or a Solid-State Disk (SSD), the memory device includes NAND memory.

Based on the memory system and operating method thereof described above, an example of the present disclosure further provides a storage medium having executable instructions stored thereon, which, when executed by a memory system, may implement the operations of the method for operating the memory system in the examples of the present disclosure described above.

In some examples, the storage medium may be memory such as Ferromagnetic Random-Access Memory (FRAM), Read Only Memory (ROM), Programmable Read-Only Memory (PROM), Erasable Programmable Read-Only Memory (EPROM), Electrically Erasable Programmable Read-Only Memory (EEPROM), Flash Memory, Magnetic Surface Memory, Optical Disk, or Compact Disc Read-Only Memory (CD-ROM); or may also be various devices including one or any combination of the memory devices described above.

In some examples, executable instructions may take the form of a program, software, software module, script, or code, written in any form of programming language (including compiled or interpreted languages, or declarative or procedural languages), and may be deployed in any form, including as a stand-alone program or as a module, component, subroutine, or other unit suitable for use in a computing environment.

As an example, executable instructions may, but do not necessarily correspond to, files in a file system, and may be stored as part of a file holding other programs or data, e.g., one or more scripts stored in a Hyper Text Markup Language (HTML) document, stored in a single file related to the program discussed, or stored in multiple collaborative files (e.g., a file that stores one or more modules, subroutines, or portions of code).

As an example, executable instructions may be deployed to execute on one memory system, or on multiple electronic devices located at one location, or to execute on multiple electronic devices distributed across multiple locations and interconnected by a communications network.

Based on this, examples of the present disclosure propose a memory system and operating method thereof, and storage medium. Wherein a memory system provided by an example of the present disclosure includes: a memory controller configured to send a first command, the first command including first data; and a memory device including a latch; the memory device coupled to the memory controller and configured to: receive the first command; in response to the first command, perform a logical operation on the first data with the latch to obtain parity data.

In an implementation, the memory controller is further configured to: send a second command; the second command includes second data; the first data includes at least a portion of the second data; the memory device further includes first memory region, the memory device is configured to: receive the second command; in response to the second command, store the second data in the first memory region.

In an implementation, when the first data includes all of the second data, the memory device is configured to: perform a first logical operation on the second data with the latch to obtain first parity data.

In an implementation, the memory device further includes a second memory region, and the memory device is further configured to: in response to the first command, store the first parity data in the second memory region.

In an implementation, the memory controller is configured to: obtain the first parity data and send a third command; the third command includes the first parity data; the memory device is configured to: receive the third command; in response to the third command, store the first parity data in the first memory region.

In an implementation, the second data includes first sub-data and second sub-data; when the first data includes a portion of the second data, the first data includes the first sub-data, the memory device is configured to: perform a second logical operation on the first sub-data with the latch to obtain second parity data.

In an implementation, the memory controller is further configured to: perform a third logical operation on the second sub-data to obtain third parity data.

In an implementation, the memory device further includes a second memory region, and the memory device is further configured to: in response to the first command, store the second parity data in the second memory region.

In an implementation, the memory controller is configured to: obtain the second parity data and send a fourth command; the fourth command includes the second parity data; the memory device is configured to: receive the fourth command; in response to the fourth command, store the second parity data in the first memory region.

In an implementation, the memory device includes a first memory plane and a second memory plane, and the first memory region is located in the first memory plane, and the second memory region is located in the second memory plane.

In an implementation, the first memory plane and the second memory plane are located in a same memory die of the memory device.

In an implementation, when the first data includes a first group of data, a second group of data and a third group of data, the latches include a plurality of latches; the plurality of latches include a first latch, a second latch and a third latch; the memory device is configured to: perform the logical operation on the first group of data with the first latch to obtain first sub-parity data; perform the logical operation on the second group of data with the second latch to obtain second sub-parity data; perform the logical operation on the third group of data with the third latch to obtain third sub-parity data.

An example of the present disclosure further provides a method for operating a memory system, the method includes: sending a first command, the first command including first data; receiving the first command; in response to the first command, performing a logical operation on the first data with a latch in a memory device to obtain parity data; wherein, the memory system includes the memory device.

In an implementation, the operating method further includes: sending a second command; the second command including second data; the first data including at least a portion of the second data; receiving the second command; in response to the second command, storing the second data in a first memory region of the memory device.

In an implementation, when the first data includes all of the second data, the performing a logical operation on the first data with a latch in a memory device to obtain parity data includes: performing a first logical operation on the second data with the latch to obtain first parity data.

In an implementation, the operating method further includes: in response to the first command, storing the first parity data in the second memory region of the memory device.

In an implementation, the operating method further includes: obtaining the first parity data and send a third command; the third command including the first parity data; receiving the third command; in response to the third command, storing the first parity data in the first memory region.

In an implementation, when the first data includes a portion of the second data, the second data includes first sub-data and second sub-data, and the first data includes the first sub-data, the performing a logical operation on the first data with a latch in a memory device to obtain parity data includes: performing a second logical operation on the first sub-data with the latch to obtain second parity data.

In an implementation, the operating method further includes: performing a third logical operation on the second sub-data to obtain third parity data.

In an implementation, the operating method further includes: in response to the first command, storing the second parity data in the second memory region of the memory device.

In an implementation, the operating method further includes: obtaining the second parity data and send a fourth command; the fourth command including the second parity data; receiving the fourth command; in response to the fourth command, storing the second parity data in the first memory region.

In an implementation, the memory device includes a first memory plane and a second memory plane, and the first memory region is located in the first memory plane, and the second memory region is located in the second memory plane.

In an implementation, the first memory plane and the second memory plane are located in a same memory die of the memory device.

In an implementation, when the first data includes a first group of data, a second group of data and a third group of data, the latches include a plurality of latches; the plurality of latches include a first latch, a second latch and a third latch; the performing a logical operation on the first data with a latch in a memory device to obtain parity data includes: performing the logical operation on the first group of data with the first latch to obtain first sub-parity data; performing the logical operation on the second group of data with the second latch to obtain second sub-parity data; performing the logical operation on the third group of data with the third latch to obtain third sub-parity data.

The present disclosure further provides a storage medium having executable instructions stored thereon, which when executed by a memory system, may implement the operations of the method for operating the memory system in the examples of the present disclosure described above.

Examples of the present disclosure propose a memory system and operating method thereof, and storage medium. Wherein the memory system includes: a memory controller configured to send a first command, the first command including first data; and a memory device including a latch; the memory device coupled to the memory controller and configured to: receive the first command; in response to the first command, perform a logical operation on the first data with the latch to obtain parity data. In examples of the present disclosure, the memory controller sends the first data to the memory device by sending a first command, and after the memory device receiving the first data, performs a logical operation on the first data with the latch of the memory device, such that it is the latch to perform logical operations of the first data, instead the memory controller to perform logical operations, thus reducing the demand for storage space of the memory controller and improving the storage performance of the memory controller, thereby improving the performance of the memory system.

It should be understood that reference throughout the description to "one example" or "an example" means that a particular feature, structure or characteristic related to the example is included in at least one example of the present disclosure. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present disclosure, sequence numbers of the processes described above do not mean the execution order, and the execution order of each process should be determined by its function and internal logic, and should not constitute any limitation to implementation process of examples of the present disclosure. The serial numbers of examples of the present disclosure described above are for the purpose of description only, and do not represent the advantages and disadvantages of the examples.

The methods disclosed in several method examples provided in the present disclosure may be combined arbitrarily without conflicts to obtain new method examples.

The above is only implementations of the present disclosure, but the claimed scope of the present disclosure is not limited thereto, and changes or substitutions within the technical scope disclosed in the present disclosure that may be easily conceived by those skilled in the art shall fall within the claimed scope of the present disclosure. Therefore, the claimed scope of the present disclosure should be determined by the claimed scope of the claims.

What is claimed is:

1. A memory system, comprising:
a memory controller configured to send a first command, the first command including first data, wherein the first data includes a first group of data, a second group of data, and a third group of data; and
a memory device including a latch, the latch includes a plurality of latches including a first latch, a second latch, and a third latch, wherein the memory device is coupled to the memory controller and configured to:
receive the first command; and
in response to the first command, perform a logical operation on the first data with the latch to obtain parity data, wherein to perform the logical operation includes to:
perform the logical operation on the first group of data with the first latch to obtain first sub-parity data:
perform the logical operation on the second group of data with the second latch to obtain second sub-parity data; and
perform the logical operation on the third group of data with the third latch to obtain third sub-parity data.

2. The memory system of claim 1, wherein the memory controller is further configured to send a second command, the second command including second data, and the first data including at least a portion of the second data; and
the memory device further includes a first memory region, and the memory device is configured to:
receive the second command; and
in response to the second command, store the second data in the first memory region.

3. The memory system of claim 2, wherein when the first data includes all of the second data, the memory device is configured to perform a first logical operation on the second data with the latch to obtain first parity data.

4. The memory system of claim 3, wherein the memory device further includes a second memory region, and the memory device is further configured to, in response to the first command, store the first parity data in the second memory region.

5. The memory system of claim 4, wherein the memory device includes a first memory plane and a second memory plane, the first memory region is located in the first memory plane, and the second memory region is located in the second memory plane.

6. The memory system of claim 3, wherein
the memory controller is configured to obtain the first parity data and send a third command, the third command including the first parity data; and
the memory device is configured to:
receive the third command; and
in response to the third command, store the first parity data in the first memory region.

7. The memory system of claim 2, wherein the second data includes first sub-data and second sub-data, and when the first data includes the portion of the second data, the first data includes the first sub-data, and the memory device is configured to perform a second logical operation on the first sub-data with the latch to obtain second parity data.

8. The memory system of claim 7, wherein the memory controller is further configured to perform a third logical operation on the second sub-data to obtain third parity data.

9. The memory system of claim 7, wherein the memory device further includes a second memory region, and the memory device is further configured to, in response to the first command, store the second parity data in the second memory region.

10. The memory system of claim 7, wherein
the memory controller is configured to obtain the second parity data and send a fourth command, the fourth command including the second parity data; and
the memory device is configured to:
receive the fourth command; and
in response to the fourth command, store the second parity data in the first memory region.

11. A method of operating a memory system, comprising:
sending a first command, the first command including first data, wherein the first data includes a first group of data, a second group of data, and a third group of data;
receiving the first command; and
in response to the first command, performing a logical operation on the first data with a latch in a memory device to obtain parity data, the latch includes a plurality of latches including a first latch, a second latch, and a third latch, wherein the memory system includes the memory device, and wherein the performing the logical operation includes:
performing the logical operation on the first group of data with the first latch to obtain first sub-parity data;
performing the logical operation on the second group of data with the second latch to obtain second sub-parity data; and
performing the logical operation on the third group of data with the third latch to obtain third sub-parity data.

12. The method of claim 11, further including:
sending a second command, the second command including second data, and the first data including at least a portion of the second data;
receiving the second command; and
in response to the second command, storing the second data in a first memory region of the memory device.

13. The method of claim 12, wherein, when the first data includes all of the second data, and the performing the logical operation on the first data with the latch in the memory device to obtain the parity data further includes performing a first logical operation on the second data with the latch to obtain first parity data.

14. The method of claim 13, further including, in response to the first command, storing the first parity data in a second memory region of the memory device.

15. The method of claim 13, further including:
obtaining the first parity data and sending a third command, the third command including the first parity data;
receiving the third command; and
in response to the third command, storing the first parity data in the first memory region.

16. The method of claim 12, wherein the second data includes first sub-data and second sub-data, when the first data includes the portion of the second data, the first data includes the first sub-data, and the performing the logical operation on the first data with the latch in the memory device to obtain the parity data further includes performing a second logical operation on the first sub-data with the latch to obtain second parity data.

17. The method of claim 16, further including, in response to the first command, storing the second parity data in a second memory region of the memory device.

18. The method of claim 16, further including:
   obtaining the second parity data and sending a fourth command, the fourth command including the second parity data;
   receiving the fourth command; and
   in response to the fourth command, storing the second parity data in the first memory region.

19. A non-transitory storage medium having executable instructions stored thereon, which when executed by a memory system, implement a method of operating the memory system, comprising:
   sending a first command, the first command including first data, wherein the first data includes a first group of data, a second group of data, and a third group of data;
   receiving the first command; and
   in response to the first command, performing a logical operation on the first data with a latch in a memory device to obtain parity data, the latch includes a plurality of latches including a first latch, a second latch, and a third latch, wherein the memory system includes the memory device, and wherein the performing the logical operation includes:
      performing the logical operation on the first group of data with the first latch to obtain first sub-parity data;
      performing the logical operation on the second group of data with the second latch to obtain second sub-parity data; and
      performing the logical operation on the third group of data with the third latch to obtain third sub-parity data.

20. The non-transitory storage medium of claim 19, wherein the method further includes sending a second command, the second command including second data, and the first data including at least a portion of the second data; and
   the memory device further includes a first memory region, and the memory device is configured to implement the method including:
   receiving the second command; and
   in response to the second command, storing the second data in the first memory region.

* * * * *